(12) United States Patent
Burns

(10) Patent No.: US 11,757,272 B2
(45) Date of Patent: Sep. 12, 2023

(54) SYSTEM FOR SECURING A COVER ON AN OUTLET BOX

(71) Applicant: Greg Burns, Stamford, CT (US)

(72) Inventor: Greg Burns, Stamford, CT (US)

( * ) Notice: Subject to any disclaimer, the term of this patent is extended or adjusted under 35 U.S.C. 154(b) by 88 days.

(21) Appl. No.: 17/209,827

(22) Filed: Mar. 23, 2021

(65) Prior Publication Data

US 2022/0311230 A1   Sep. 29, 2022

(51) Int. Cl.
*H02G 3/14* (2006.01)
*H02G 3/08* (2006.01)

(52) U.S. Cl.
CPC ............... *H02G 3/14* (2013.01); *H02G 3/081* (2013.01)

(58) Field of Classification Search
CPC ............ H02G 3/14; H02G 3/081; H02G 3/08; H05K 5/00; H05K 5/02; H05K 5/0004; H05K 5/03; A47B 47/005
USPC ................. 174/66, 67, 480, 481, 50, 53, 57; 220/3.2–3.9, 4.02, 241, 242; 439/535, 439/536
See application file for complete search history.

(56) References Cited

U.S. PATENT DOCUMENTS

| | | | | |
|---|---|---|---|---|
| 3,885,852 A * | 5/1975 | Grove | ...................... | H02G 3/18 174/53 |
| 4,273,957 A * | 6/1981 | Kolling, Jr. | ......... | H04M 1/0293 174/53 |
| 5,072,848 A * | 12/1991 | Pipis | ........................ | H02G 3/14 174/66 |
| 6,503,099 B2 * | 1/2003 | Kerr, Jr. | ................. | F21V 21/002 439/537 |
| 6,799,982 B2 * | 10/2004 | Kerr, Jr. | .................... | H02G 3/20 439/537 |
| 6,803,522 B2 * | 10/2004 | Skakun | ...................... | H02G 3/14 174/67 |
| 6,878,878 B2 * | 4/2005 | Westlake | .................. | H02G 3/14 174/67 |
| 7,064,269 B2 * | 6/2006 | Smith | ..................... | H01R 33/46 174/50 |
| 8,158,883 B2 * | 4/2012 | Softer | ...................... | H04B 3/56 174/480 |
| 9,000,298 B2 * | 4/2015 | Byrne | ..................... | H02G 3/081 174/67 |
| 9,065,264 B2 * | 6/2015 | Cooper | ..................... | H02G 3/14 |
| 10,756,453 B2 * | 8/2020 | Kimmel | .................... | H02G 3/20 |
| 10,965,110 B2 * | 3/2021 | Lagree | ................... | A47B 81/00 |

* cited by examiner

*Primary Examiner* — Angel R Estrada
(74) *Attorney, Agent, or Firm* — ICE MILLER LLP

(57) ABSTRACT

A system for securing a cover on an electrical box is provided having an electrical box, an electrical box cover, the electrical box having at least two screw receptors, the electrical box cover having at least two screw pass-throughs, the at least two screw receptors corresponding to the at least two screw pass-throughs, such that a screw inserted in one of the screw pass-throughs may be secured in the screw receptor to hold the electrical box and electrical box cover together, the electrical box having a first temporary connector, the electrical box cover having a second temporary connector, and the first temporary connector and the second temporary connector corresponding to one another such that the electrical box and the electrical box cover are held together while screws are inserted into the at least one screw pass-throughs and screw receptors.

18 Claims, 6 Drawing Sheets

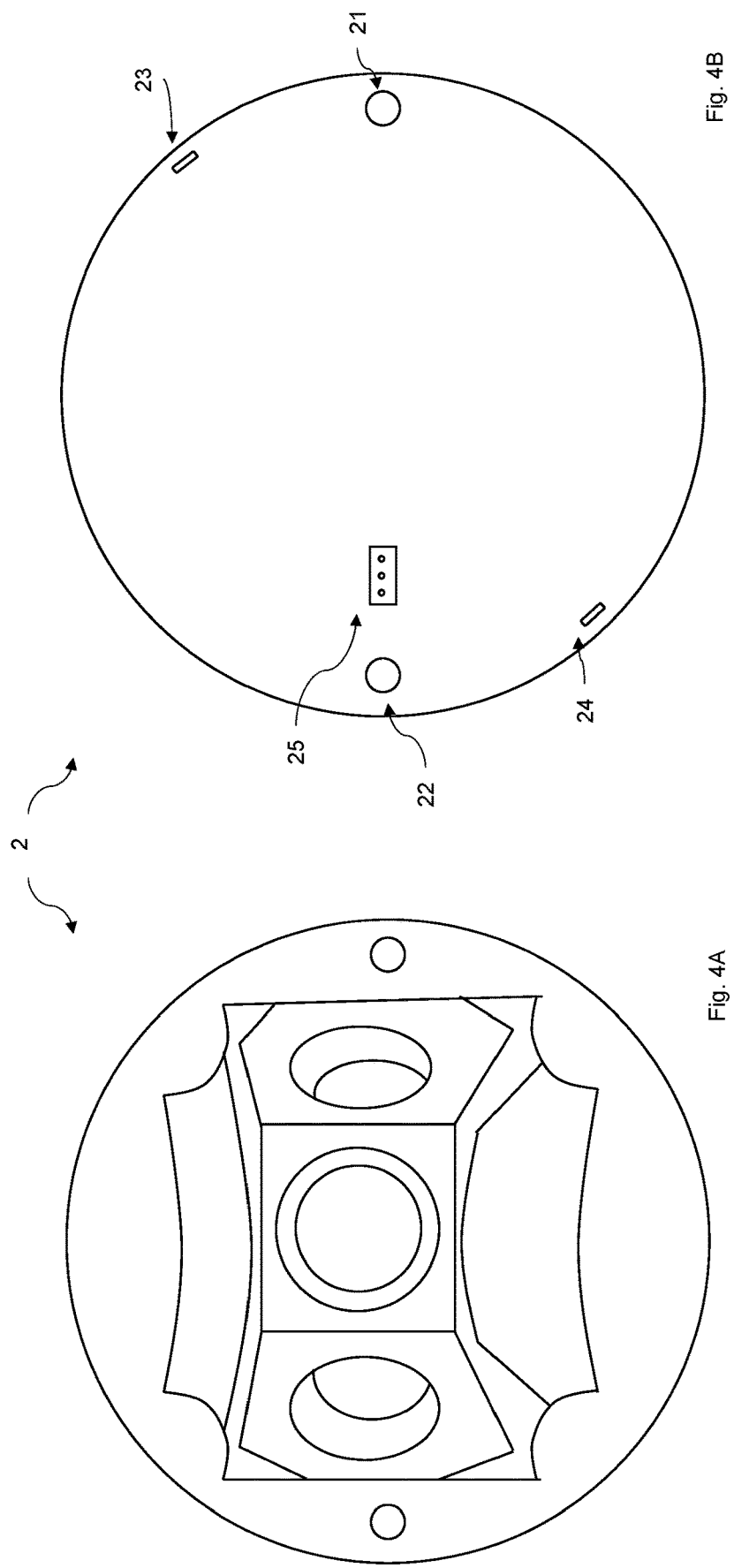

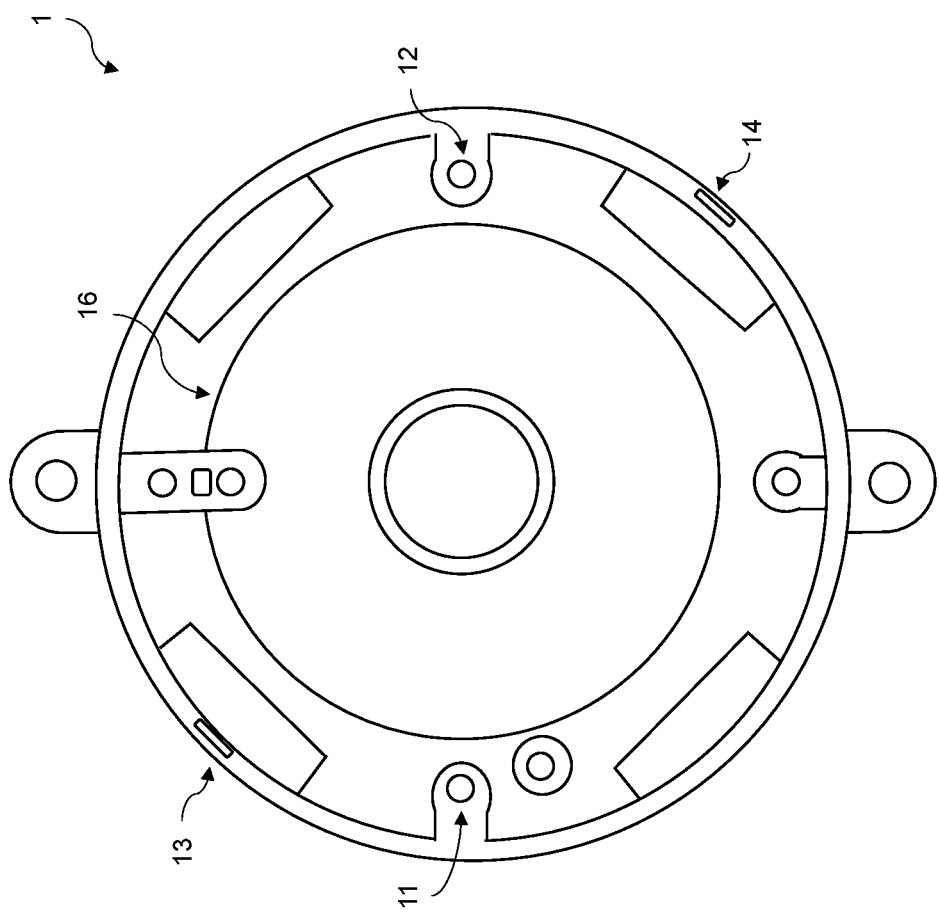

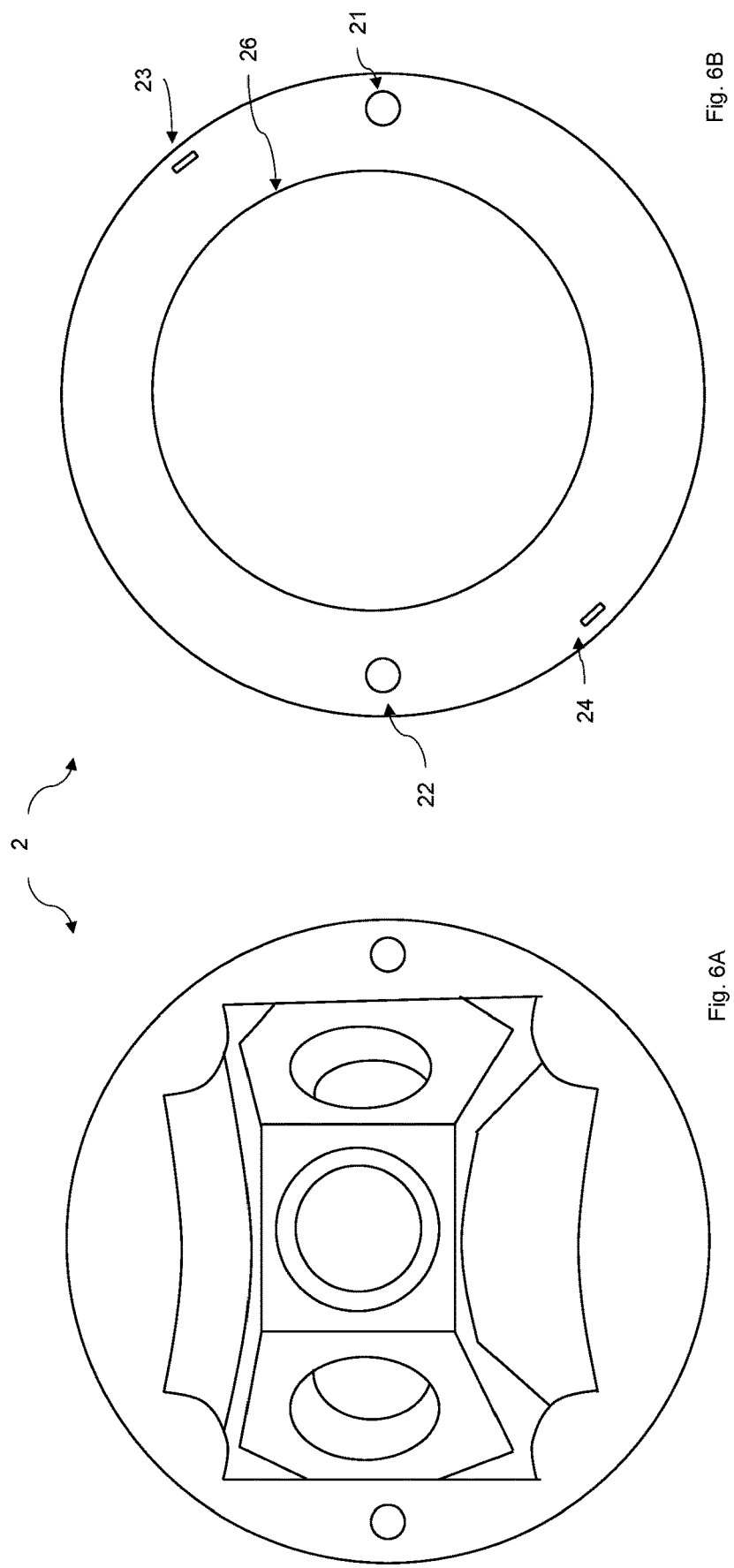

SYSTEM FOR SECURING A COVER ON AN OUTLET BOX

TECHNICAL FIELD

The present disclosure relates to an improved system for securing an electrical box cover to an electrical box.

BACKGROUND

Outdoor electrical boxes, including ones used for floodlights, have been standard for many years. Typically, they include an outdoor electrical box and a standard mating cover. The cover may be a non-removable part of a flood light or other electrical component assembly.

There are numerous problems with the standard outdoor electrical boxes for floodlights.

An electrician, other professional, or do-it-yourselfer may require a ladder during installation of an outdoor electrical box, especially for a floodlight, which can be installed at heights of 10-30 ft, or higher. Compounding the danger of the height is the fact that two hands are required for much of the installation process. For example, when putting the cover/floodlight assembly on the electrical box, one hand is required to hold the cover/floodlight assembly in place, while the other is used to insert two screws. The same issues are faced when removing or replacing a floodlight assembly—two hands are required to unscrew potentially weather-damaged screws. Furthermore, safety issues arise when wiring the electrical device when at heights because two hands are again required.

These and other problems are solved by the present disclosure.

SUMMARY

It is an object of the present invention to provide a temporary connection between an electrical box and its cover.

It is a further objection of the present invention to provide a safer way to connect an electrical box cover to an electrical box.

It is a further objection of the present invention to provide a safer way to wire a light or outlet attached to an electrical box cover.

In one aspect of the present disclosure, a system for securing a cover on an electrical box is provided having an electrical box, an electrical box cover, the electrical box having at least two screw receptors, the electrical box cover having at least two screw pass-throughs, the at least two screw receptors corresponding to the at least two screw pass-throughs, such that a screw inserted in one of the screw pass-throughs may be secured in the screw receptor to hold the electrical box and electrical box cover together, the electrical box having a first temporary connector, the electrical box cover having a second temporary connector, and the first temporary connector and the second temporary connector corresponding to one another such that the electrical box and the electrical box cover are held together while screws are inserted into the at least one screw pass-throughs and screw receptors.

BRIEF DESCRIPTION OF THE DRAWINGS

FIG. 4a is a front view of an electrical box cover.
FIG. 4b is a back view of an electrical box cover with a power connector.
FIG. 5 is a front view of an electrical box with a power connector.
FIG. 6a is a front view of an electrical box cover.
FIG. 6b is a back view of an electrical box cover with a power connector.

DETAILED DESCRIPTION

Figure 1:
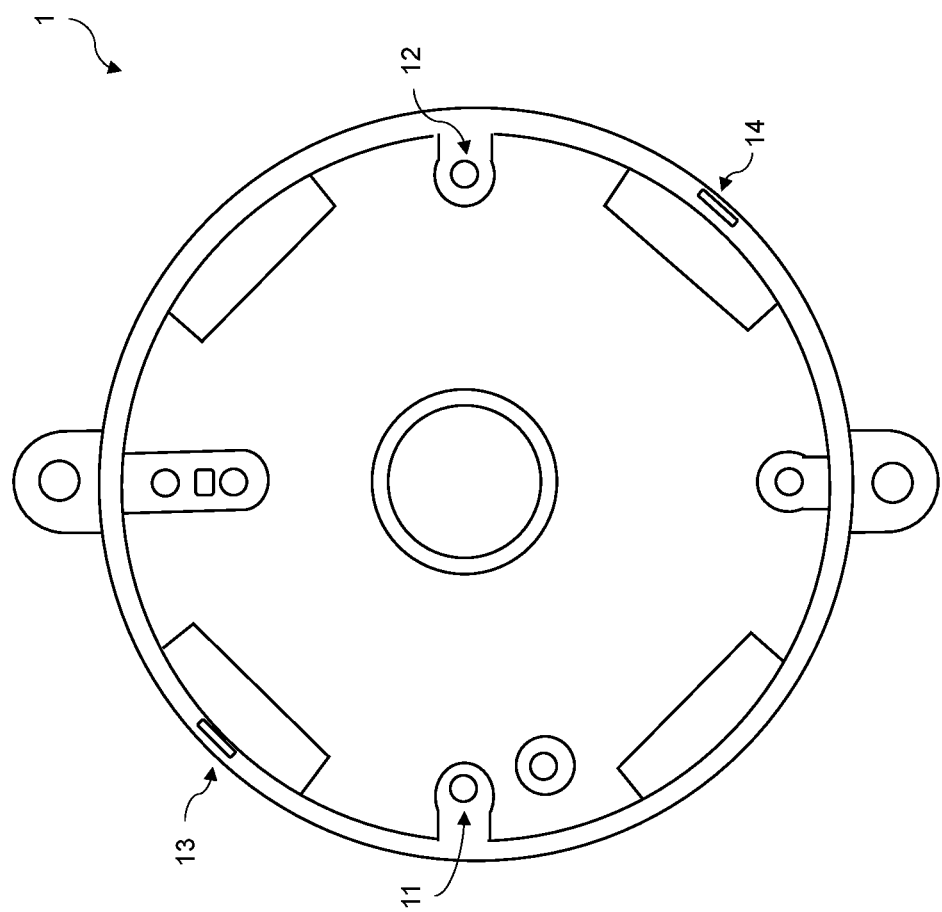
FIG. 1 is a front view of an electrical box.

FIGS. 1, 2a, and 2b show an electrical box 1 and an electrical box cover 2.

The electrical box 1 has screw receptors 11, 12. The screw receptors 11, 12 may have male or female threads at any known pitch. Any number of screw receptors 11, 12 may be provided and/or used. The screw receptors 11, 12 may be placed at any location on the electrical box 1.

The electrical box cover 2 has screw pass-throughs 21, 22. The screw pass-throughs may or may not be threaded, but may include male or female threads at any known pitch. Any number of screw pass-throughs 21, 22 may be provided and/or used. The screw pass-throughs 21, 22 may be placed at any location on the electrical box cover 2, but should correspond with screw receptors 11, 12.

Screw receptors 11, 12 are configured to receive screws that hold the electrical box cover 2 to the electrical box 1. The connection established by the screws between the electrical box cover 2 and the electrical box 1 may be waterproof. The connection established by the screws may be permanent or hard to remove (e.g., using tamper resistant or one-way screws).

Other connectors, such as nails, nuts and bolts, etc. may be used to secure the electrical box cover 2 to the electrical box 1, instead of or in addition to screws, and screw receptors 11, 12, and screw-pass throughs 21, 22 may be modified accordingly to receive other connectors.

Figure 3:
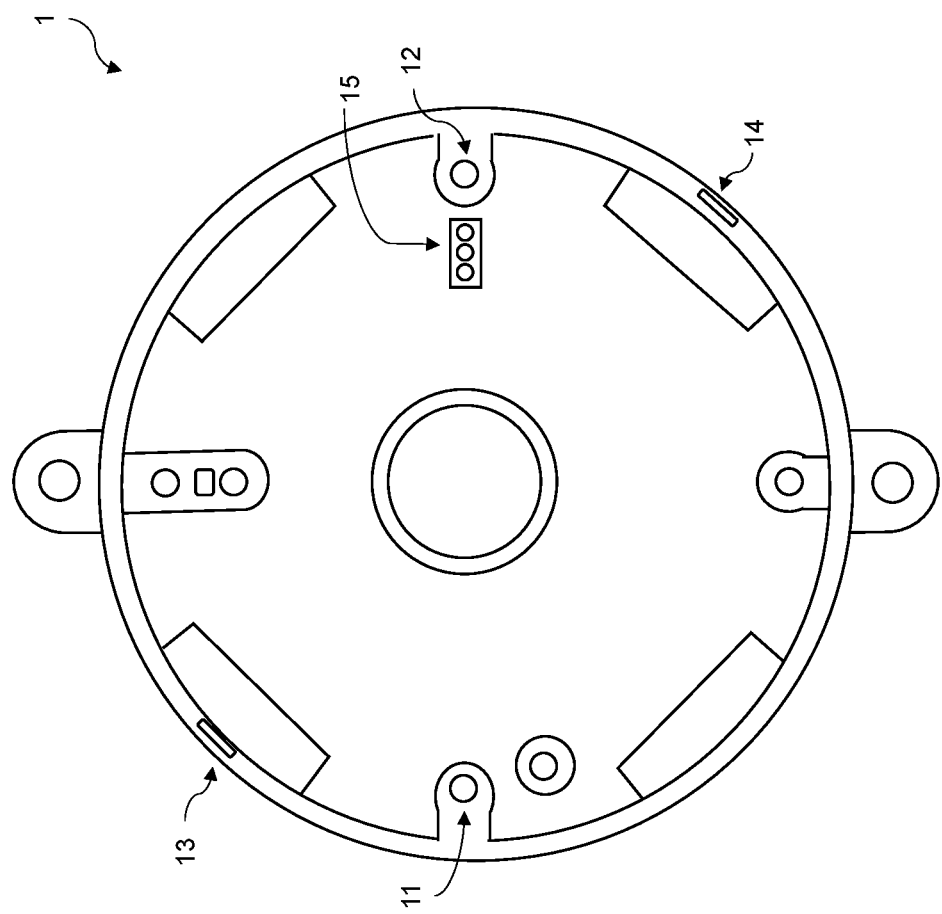
FIG. 3 is a front view of an electrical box with a power connector.

During installation of the electrical box cover 2 on the electrical box 1, a temporary connection may be made. Electrical box 1 is provided with temporary connectors 13, 14, which correspond with temporary connectors 23, 24 on the electrical box cover 2. Temporary connectors 13, 14, 23, 24 may be configured to be protrusions and receptors (e.g., that mate by rotating the cover). As shown in FIGS. 1 and 3, the electrical box 1 has receptors 13, 14, and the electrical box cover 2 has protrusions 23, 24. The receptors 13, 14 receive the protrusions 23, 24, after which the electrical box cover 2 is rotated to temporarily secure it to the electrical box 1.

Figure 2:
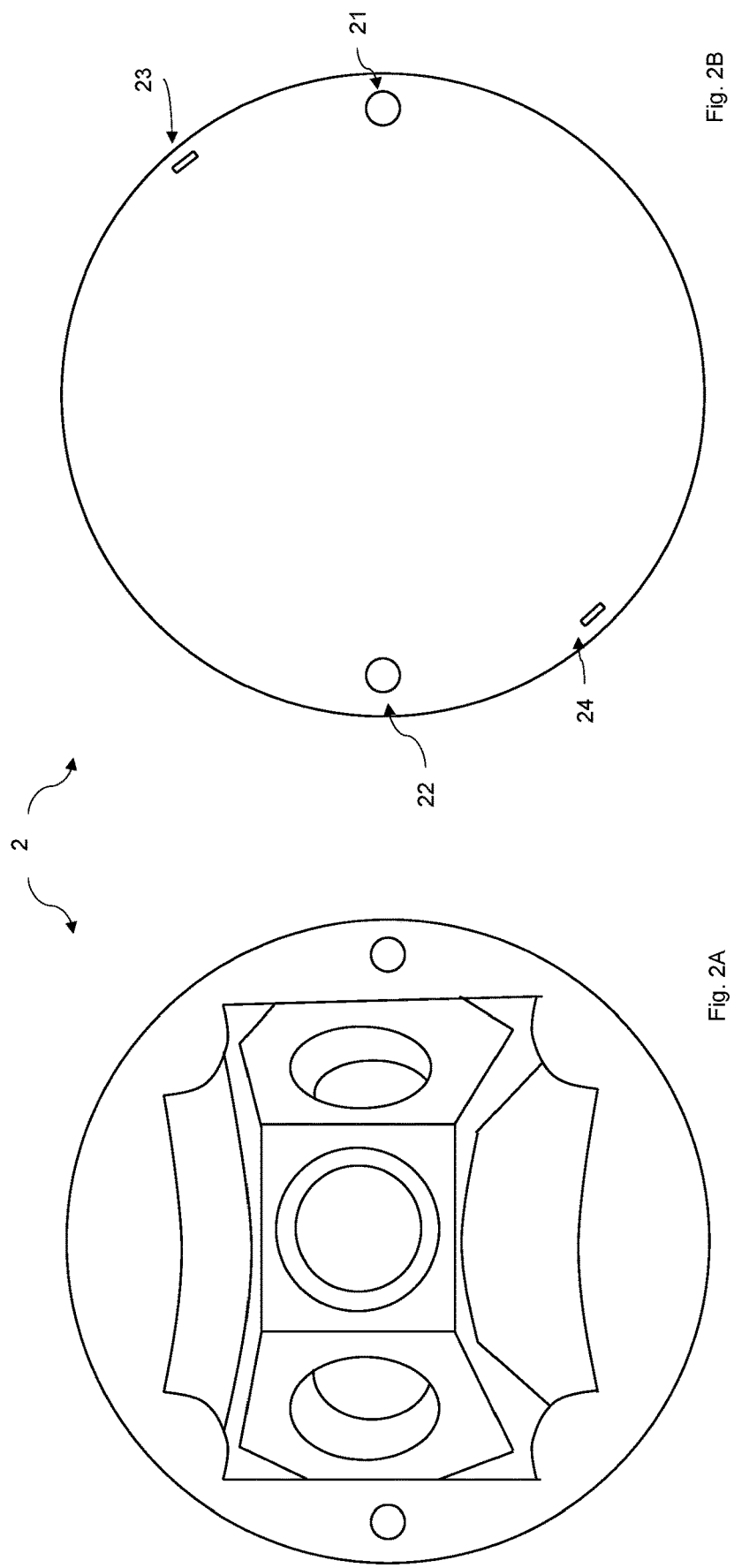
FIG. 2a is a front view of an electrical box cover.
FIG. 2b is a back view of an electrical box cover.

The protrusions 23, 24 and receptors 13, 14 may be on either the electrical box 1 or the electrical box 2, or a combination thereof. Though two pairs of temporary connection are shown in FIG. 2, placement, number, size, orientation, and configuration thereof may be modified as needed to establish a temporary connection. Rotation of the electrical box cover 2 may not be required, for example, if the receptors 13, 14 lock the protrusions 23, 24 upon insertion.

Temporary connectors 13, 14, 23, 24 may also be any type of connector to establish a temporary connection. Temporary connectors 13, 14, 23, 24 may be an adhesive and an adhesive contact surface. Temporary connectors 13, 14, 23, 24 may be hook and loop fasteners.

Depending on factors such as the intended use of the electrical box (e.g., for a flood light) or the type of temporary connectors 13, 14, 23, 24 used, the placement, number, size, orientation, and configuration thereof may be modified as needed.

FIGS. 3, 4a, and 4b, and 5, 6a, and 6b also show an electrical box 1 and an electrical box cover 2.

In FIGS. 3, 4a, and 4b, electrical box 1 has a power connector 15 for providing power to the electrical box cover 2. Electrical box cover 2 has a power connector 25. Power connectors 15 and 25 are placed, sized, oriented, and configured such that they attach to one another. The placement, number, size, orientation, and configuration of the power connectors 15 and 25 may be modified as needed. Power connectors 15 and 25 may have hot, ground, and neutral terminals.

The attachment between power connectors 15 and 25 may occur simultaneously or as a result of the temporary connectors 13, 14, 23, and 24 connecting.

Power connectors 15 and 25 may be any type of power connectors. For example, FIGS. 5, 6a, and 6b show power terminal rings 16 and 26. Power terminal rings 16 and 26 may be segmented to deliver hot, ground, and neutral lines.

The power terminal 25, 26 may be further connected to a second power terminal on the electrical box cover 2 for providing power to an attached electrical device such as a floodlight. As a result, an electrician can wire the electrical device to the electrical box cover on the ground, and easily install it on the electrical box.

As a result of the temporary connectors 13, 14, 23, and 24, and/or the power connectors 15, 25, 16, 26, safety is improved for those install electrical boxes.

Although the invention has been illustrated and described herein with reference to a preferred embodiment and a specific example thereof, it will be readily apparent to those of ordinary skill in the art that other embodiments and examples may perform similar functions and/or achieve user experiences. All such equivalent embodiments and examples are within the spirit and scope of the present invention, are contemplated thereby, and are intended to be covered by the disclosure.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the invention, and is not intended to limit the invention to a specific embodiment illustrated by the figures above or description below.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components. As used herein, the term "and/or" includes any and all combinations of one or more of the associated listed items. As used herein, the term "application" is intended to be interchangeable with the term "invention", unless context clearly indicates otherwise.

While the present teachings have been described above in terms of specific embodiments, it is to be understood that they are not limited to these disclosed embodiments. Many modifications and other embodiments will come to mind to those skilled in the art to which this pertains, and which are intended to be and are covered by this disclosure. It is intended that the scope of the present teachings should be determined by proper interpretation and construction of the disclosure and its legal equivalents, as understood by those of skill in the art relying upon the disclosure in this specification and the attached drawings. In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification should be read with the understanding that such combinations are entirely within the scope of the invention.

What is claimed is:

1. A system for securing a cover on an electrical box, comprising:
    an electrical box;
    an electrical box cover;
    the electrical box having at least two screw receptors;
    the electrical box cover having at least two screw pass-throughs;
    the at least two screw receptors corresponding to the at least two screw pass-throughs, such that a screw inserted in one of the screw pass-throughs may be secured in the screw receptor to hold the electrical box and electrical box cover together;
    the electrical box having a first temporary connector;
    the electrical box cover having a second temporary connector;
    the first temporary connector and the second temporary connector corresponding to one another such that the electrical box and the electrical box cover are held together while screws are inserted into the at least one screw pass-throughs and screw receptors;
    the electrical box cover rotatable to establish the temporary connection between the electrical box and the electrical box cover.

2. The system of claim 1, the first connector being a recess, and the second connector being a protrusion.

3. The system of claim 1, the first connector being a protrusion, and the second connector being a recess.

4. The system of claim 1, wherein the first connector and the second connector are hook and loop fasteners.

5. The system of claim 1, wherein the first connector and the second connector are an adhesive and an adhesive receiving surface.

6. The system of claim 1, further comprising:
    a first power terminal on the electrical box for providing power to the electrical box cover;
    a second power terminal on the electrical box cover;
    the first power terminal and the second power terminal being connectable to one another.

7. The system of claim 6, wherein the first power terminal and the second power terminal are connected when the electrical box and the electrical box cover are held together by the first temporary connector and the second temporary connector.

8. The system of claim 6, wherein the first power terminal and the second power terminal include a male and a receptor.

9. The system of claim 6, wherein the first power terminal and the second power terminal are strips of conductive metal.

10. The system of claim 1, wherein the electrical box cover has a provision for the attachment of one or more light fixtures.

11. The system of claim 1, wherein the electrical box cover has a provision for the attachment of one or more motion sensors.

12. The system of claim 1, wherein the electrical box cover has a provision for the attachment of one or more light sensors.

13. The system of claim 1, wherein the electrical box cover has a provision for the attachment of one or more cameras.

14. The system of claim 1, wherein the electrical box cover has a provision for the attachment of one or more rain gauges.

15. The system of claim 1, wherein the electrical box cover has a provision for the attachment of one or more wind speed or wind direction sensors.

16. The system of claim 1, wherein the electrical box cover has a provision for the attachment of one or more atmospheric pressure sensors.

17. The system of claim 1, wherein the electrical box cover has a provision for the attachment of one or more speakers or microphones.

18. The system of claim 1, wherein the electrical box cover has a provision for the attachment of one or more electrical outlets.

* * * * *